US012749238B2

(12) United States Patent
Chen et al.

(10) Patent No.: US 12,749,238 B2
(45) Date of Patent: Sep. 29, 2026

(54) DISPLAY CONTROL CHIP FOR ADJUSTING ON-SCREEN DISPLAY INFORMATION, OPERATING METHOD THEREOF AND DISPLAY SYSTEM COMPRISING THE SAME

(71) Applicant: Realtek Semiconductor Corporation, Hsinchu (TW)

(72) Inventors: Yung-Chih Chen, Hsinchu (TW); Wei-Chih Lin, Hsinchu (TW); Jui-Te Wei, Hsinchu (TW); Po-An Chen, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 255 days.

(21) Appl. No.: 18/448,176

(22) Filed: Aug. 11, 2023

(65) Prior Publication Data

US 2024/0331231 A1 Oct. 3, 2024

(30) Foreign Application Priority Data

Mar. 31, 2023 (TW) ................................ 112112680

(51) Int. Cl.

*G06T 11/26* (2026.01)
*G06T 11/60* (2006.01)
*G09G 5/14* (2006.01)

(52) U.S. Cl.

CPC .............. *G06T 11/26* (2026.01); *G06T 11/60* (2013.01); *G09G 5/14* (2013.01); *G09G 2340/12* (2013.01)

(58) Field of Classification Search

CPC ......... G06T 11/206; G06T 11/60; G09G 5/14; G09G 2340/12

See application file for complete search history.

(56) References Cited

U.S. PATENT DOCUMENTS 4,864,517 A 9/1989 Maine et al.
5,325,183 A 6/1994 Rhee
(Continued)

FOREIGN PATENT DOCUMENTS

CN 101431633 B 1/2011
CN 102141916 B 11/2013
(Continued)

OTHER PUBLICATIONS

HIGHCHARTS_DESIGN, "https://web.archive.org/web/20220324154204/https://www.highcharts.com/docs/chart-design-and-style/design-and-style", Mar. 24, 2022. (Year: 2022).*
(Continued)

*Primary Examiner* — Michelle L Sams
(74) *Attorney, Agent, or Firm* — CKC & Partners Co., LLC

(57) ABSTRACT

A display control chip includes a first memory and a computing circuit. The first memory is configured to store a plurality of chart templates. The computing circuit is coupled with the first memory, is configured to receive first update data, and is configured to use the first update data to update raw data in a second memory. When the computing circuit reads the raw data in the second memory, the computing circuit is configured to: determine a target chart template of the plurality of chart templates, according to the first update data; convert the raw data into a chart image, according to the target chart template; and output first display data according to the chart image, in which the first display data is for generating a first display picture including the chart image.

16 Claims, 4 Drawing Sheets

(56) References Cited

U.S. PATENT DOCUMENTS

| | | | | |
|---|---|---|---|---|
| 5,559,952 | A | 9/1996 | Fujimoto | |
| 7,047,552 | B2 | 5/2006 | Chung et al. | |
| 7,962,736 | B1 | 6/2011 | Polyudov | |
| 8,224,152 | B2 | 7/2012 | Ryu | |
| 9,250,687 | B1 | 2/2016 | Aswadhati | |
| 10,440,532 | B2 * | 10/2019 | Liu | H04W 4/18 |
| 2001/0040581 | A1 | 11/2001 | Reddy | |
| 2004/0169631 | A1 * | 9/2004 | Tanaka | G09G 5/006 345/96 |
| 2008/0252604 | A1 | 10/2008 | Huang et al. | |
| 2009/0015581 | A1 | 1/2009 | Hirohara | |
| 2010/0026693 | A1 | 2/2010 | Kim et al. | |
| 2010/0103319 | A1 | 4/2010 | Li et al. | |
| 2011/0096090 | A1 | 4/2011 | Lee | |
| 2013/0268780 | A1 * | 10/2013 | Wong | G06F 1/266 713/300 |
| 2014/0300603 | A1 * | 10/2014 | Greenfield | G06T 11/20 345/440 |
| 2015/0095814 | A1 | 4/2015 | Liu et al. | |
| 2016/0055624 | A1 | 2/2016 | Ohno | |
| 2016/0328866 | A1 | 11/2016 | Neulander | |
| 2017/0124350 | A1 * | 5/2017 | Reihman | A61B 5/746 |
| 2020/0167113 | A1 | 5/2020 | Chen et al. | |
| 2024/0212557 | A1 | 6/2024 | Lakshminarayanan et al. | |

FOREIGN PATENT DOCUMENTS

| | | | |
|---|---|---|---|
| CN | 103916671 | A | 7/2014 |
| CN | 104639854 | B | 8/2017 |
| CN | 106162299 | B | 4/2020 |
| CN | 111026679 | A | 4/2020 |
| TW | 201116054 | A1 | 5/2011 |
| TW | I408958 | B | 9/2013 |

OTHER PUBLICATIONS

HIGHCHARTS_FRONT, “https://web.archive.org/web/20220324003532/https://www.highcharts.com/”, Mar. 24, 2022 (Year: 2022).*

Brandon’s Excel Tutorials, “How to Add a Picture to a Chart Background in Microsoft Excel”, https://www.youtube.com/watch?v=bFJ33w-yPg4 Nov. 12, 2022 (Year: 2022).*

Davis, Peter, “How to Capture a Photo From a Video”, https://www.kapwing.com/resources/how-to-capture-a-photo-from-a-video/ Jul. 26, 2021 (Year: 2021).*

* cited by examiner

DISPLAY CONTROL CHIP FOR ADJUSTING ON-SCREEN DISPLAY INFORMATION, OPERATING METHOD THEREOF AND DISPLAY SYSTEM COMPRISING THE SAME

RELATED APPLICATIONS

This application claims priority to Taiwan Application Serial Number 112112680, filed on Mar. 31, 2023, which is herein incorporated by reference in its entirety.

BACKGROUND

Technical Field

The disclosure is related to an on-screen display (OSD) technology. More particularly, the disclosure is related to a display control chip, an operating method and a display system that are able to customize and adjust OSD information.

Description of Related Art

On-screen display (OSD) information is built into the firmware of the display device, thus the display device is still able to display OSD information when it is not connected to a video signal source. The OSD information is usually used as a control menu of the display device, so as to allow users to configure the functions of the display device. However, the OSD information of traditional display device cannot be modified after leaving the factory, thus limiting the application scenarios of the display device.

SUMMARY

An operating method for a display control chip is provided in present disclosure. The display control chip comprises a first memory configured to store a plurality of chart templates. The operating method comprises the following steps: using first update data to update raw data in a second memory; determining a target chart template of the plurality of chart templates according to the raw data; converting the raw data into a chart image according to the target chart template; and outputting first display data according to the chart image, wherein the first display data is for generating a first display picture comprising the chart image.

A display control chip is provided in present disclosure. The display control chip comprises a first memory and computing circuit. The first memory is configured to store a plurality of chart templates. The computing circuit is coupled to the first memory, configured to receive first update data, and configured to use the first update data to update raw data in a second memory. The display control chip is coupled to the second memory and a display circuit. When the computing circuit reads the raw data in the second memory, the computing circuit is configured to: determine a target chart template of the plurality of chart templates according to the raw data; convert the raw data into a chart image according to the target chart template; and output first display data according to the chart image, wherein the first display data is for generating a first display picture comprising the chart image.

A display system is provided in present disclosure. The display system comprises an input device and a display control chip. The input device is configured to receive a plurality of values inputted by a user, and convert the plurality of values into first update data. The display control chip is configured to communicate with the input device for receiving the first update data, and comprises a first memory. The first memory is configured to store a plurality of chart templates. The display system further comprises a second memory and a display circuit. The second memory is configured to store raw data. When the display control chip reads the raw data in the second memory, the display control chip is configured to: determine a target chart template of the plurality of chart templates according to the raw data; convert the raw data into a chart image according to the target chart template; and output first display data according to the chart image, wherein the first display data is for generating a first display picture comprising the chart image.

One of the advantages of the aforementioned display control chip, operating method and display system is that customized information can be saved for a long time to be displayed repeatedly.

It should be understood that both the foregoing general description and the following detailed description are by examples, and are intended to provide further explanation of the disclosure as claimed.

DETAILED DESCRIPTION

Figure 1:
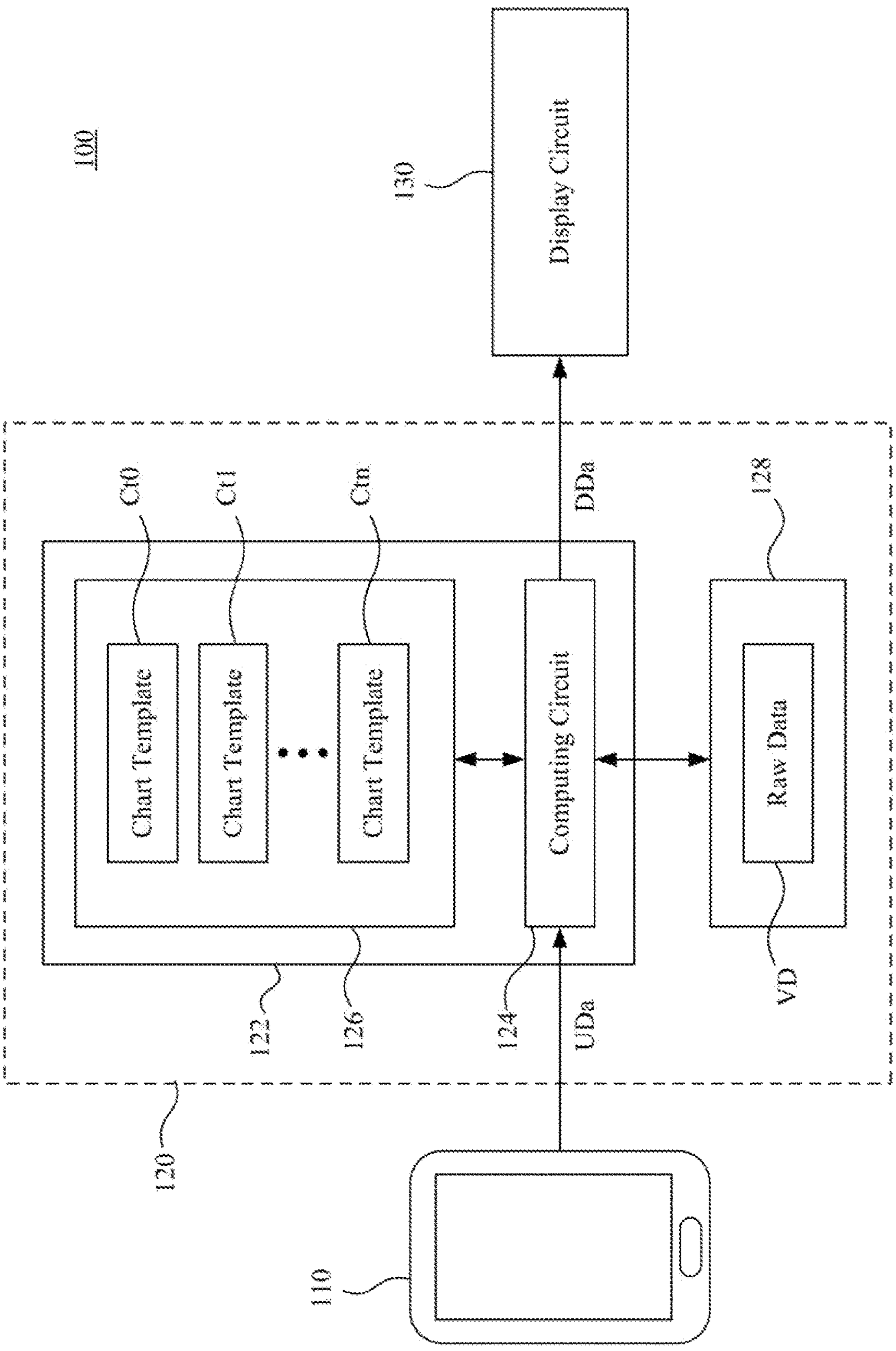
FIG. 1 is a simplified functional block diagram of a display system in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a simplified functional block diagram of a display system 100 in accordance with some embodiments of the present disclosure. The display system 100 comprises an input device 110, a control circuit 120 and a display circuit 130. The control circuit 120 is coupled between the input device 110 and the display circuit 130. The input device 110 and the control circuit 120 may be coupled to each other through various suitable wired or wireless transmission methods, such as universal serial bus (USB), Wi-Fi, Bluetooth, universal asynchronous receiver/transmitter (UART), wired network, etc. The control circuit 120 is configured to receive update data UDa from the input device 110, and configured to output display data DDa to the display circuit 130 according to the update data UDa, so as to control on-screen display (OSD) information of the display circuit 130. In some embodiments, the control circuit 120 may receive video data from an external video source (not shown, such as a display card), and the control circuit 120 is configured to synchronously generate display data DDa according to the update data UDa and the video data.

In some embodiments, the display circuit 130 comprises a display panel, a data driving circuit, a scan driving circuit and a timing control circuit. The control circuit 120 and the display circuit 130 may be integrated into the same display device, such as a television, a computer screen or an electronic signage.

A display control chip 122 of the control circuit 120 comprises a computing circuit 124 and a memory 126. The computing circuit 124 may read the memory 126, wherein the memory 126 is configured to store chart templates Ct0-Ctn. In some embodiments, the chart templates Ct0-Ctn comprise bar charts, histograms, pie charts, line charts, etc. Each of the chart templates Ct0-Ctn comprises font styles, color styles and style information. The font styles comprise primary fonts (e.g., large fonts for titles) and/or secondary fonts (e.g., small fonts for axis names or descriptive text). The color styles comprise axis colors, text colors, and/or colors for graphical elements (e.g., dots or bars). The style information comprises axis style (e.g., line thickness), graphic element style (e.g., point size or bar width), background pattern and/or resolution (i.e., chart length and width).

The computing circuit 124 may also read another memory 128 in the control circuit 120. The memory 128 is configured to store raw data VD, wherein the raw data VD comprises a plurality of values. The computing circuit 124 is configured to update the raw data VD by using the update data UDa. The computing circuit 124 is further configured to read the raw data VD, and control the OSD information displayed by the display circuit 130 according to the raw data VD. In some embodiments, the memory 128 is a non-volatile memory, such as an electrically-erasable programmable read-only memory (EEPROM) or a flash memory.

In some embodiments, the display control chip 122 and the memory 128 are different circuits located on the same circuit board. In other embodiments, the memory 128 is a pluggable memory device (e.g., an USB flash drive), and is electrically connected to the display control chip 122 in a pluggable manner.

Figure 2:
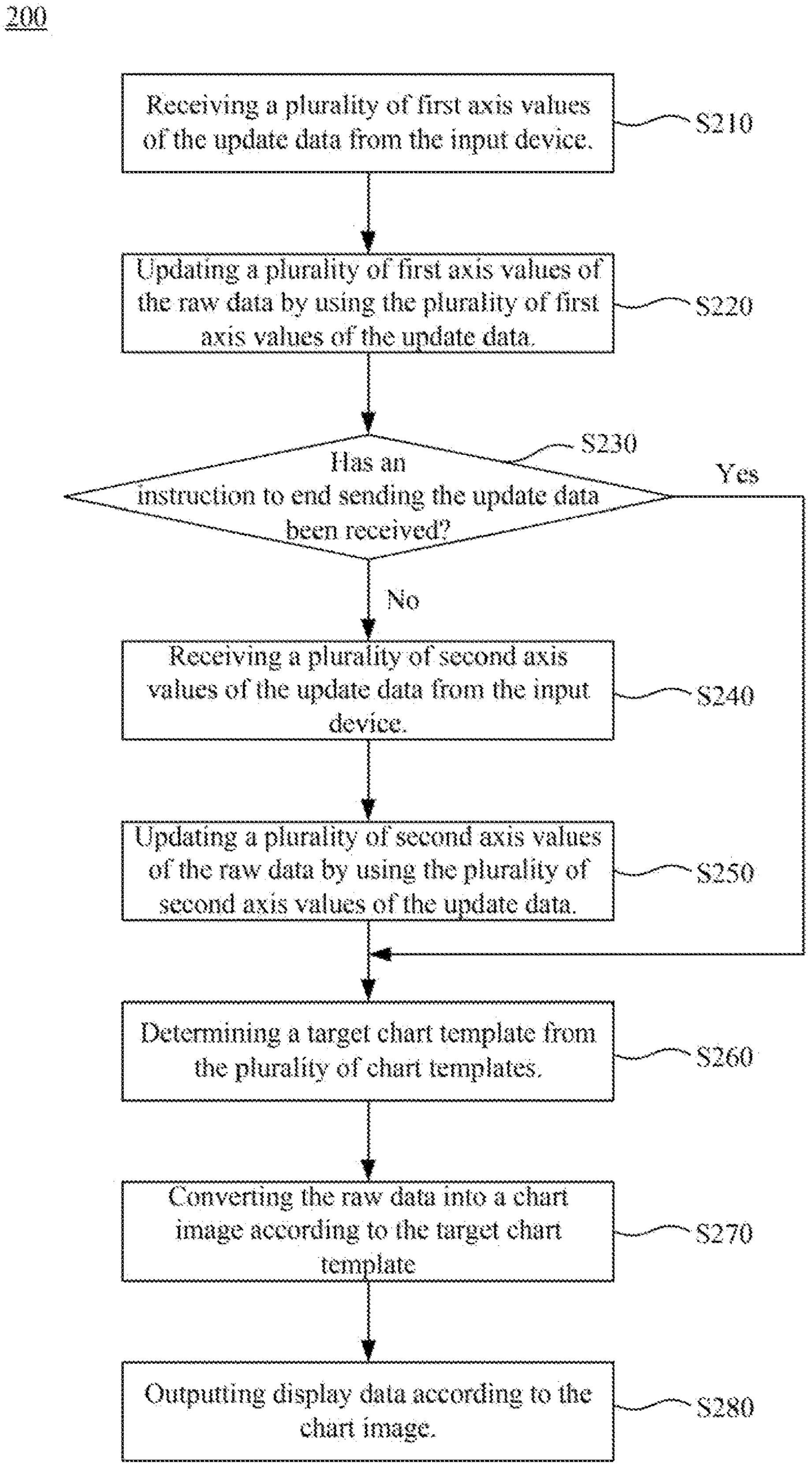
FIG. 2 is a flowchart of an operating method in accordance with some embodiments of the present disclosure.

FIG. 2 is a flowchart of an operating method 200 in accordance with some embodiments of the present disclosure. The operating method 200 is applicable to the display control chip 122 of FIG. 1. In step S210, the computing circuit 124 is configured to receive a plurality of first axis (e.g., horizontal axis) values of the update data UDa from the input device 110. In step S220, the computing circuit 124 updates (e.g., replaces) a plurality of first axis values of the raw data VD by using the plurality of first axis values of the update data UDa.

In step S230, the computing circuit 124 determines whether an instruction to end sending the update data UDa is received from the input device 110. If the determination in step S230 is "Yes", it means that the user wants to generate a one-dimensional chart (e.g., a pie chart), and the computing circuit 124 will execute step S260. If the determination in step S230 is "No", it means that the user wants to generate a two-dimensional chart (e.g., a line chart), and the computing circuit 124 will execute step S240 to receive a plurality of second axis (e.g., vertical axis) values of the update data UDa. Next, the computing circuit 124 executes step S250 to use the plurality of second-axis values of the update data UDa to update (e.g., replace) the plurality of second-axis values of the raw data VD.

In some embodiments, the input device 110 may receive a plurality of values inputted by the user with an input interface (not shown, e.g., a keyboard, a touch screen or a microphone). In other embodiments, the input device 110 may not need to comprise an input interface, and may generate the update data UDa by itself. For example, the input device 110 may be a measuring instrument such as an illuminance meter, a decibel meter, etc., and the input device 110 may convert the measured value into the update data UDa.

In step S260, the computing circuit 124 determines a target chart template from the chart templates Ct0-Ctn, and the target chart is used to convert the raw data VD into a chart in the follow-up steps. In an embodiment, the user may use the input device 110 to specify a chart type to be generated, and the input device 110 records the chart type specified by the user in the chart type information of the update data UDa. The computing circuit 124 stores the chart type information in the raw data VD, and selects a target chart template from the chart templates Ct0-Ctn according to the chart type information. For example, the chart types of each of the chart templates Ct0-Ctn may be different, when the chart type information in the raw data VD indicates that the user wants to generate a bar chart, the computing circuit 124 will select a bar chart template from the chart templates Ct0-Ctn as the target chart template.

In another embodiment, each of the chart types of corresponds to a plurality of chart templates. For example, the chart templates Ct0-Ctn may comprise X different histogram templates, Y different line chart templates, Z different pie chart templates, etc., wherein X, Y and Z are positive integers. The computing circuit 124 determines a plurality of candidate chart templates matching the chart type information from the chart templates Ct0-Ctn, according to the chart type information of the raw data VD. For example, when the chart type information of the raw data VD indicates that the user wants to generate a histogram, the computing circuit 124 will select all histogram templates from the chart templates Ct0-Ctn as the candidate chart templates. Next, the computing circuit 124 reads the raw data VD in the memory 128 and selects the target chart template from the plurality of candidate chart templates according to at least one of the following elements: (1) the number of the plurality of first axis values of the raw data VD; and (2) the number of the plurality of second axis values of the raw data VD. In other words, the computing circuit 124 can select a way to clearly present the raw data VD according to the number of data points, wherein a data point indicates an intersection of a first axis value of the raw data VD and a second axis value of the raw data VD.

For example, when the number of the first axis (e.g., horizontal axis) values is greater than the number of the second axis (e.g., vertical axis) values, the computing circuit 124 may select a target graph template with the first axis having a higher resolution (i.e., horizontal resolution). For another example, if the number of data points is greater a number threshold, the computing circuit 124 may select a target graph template with a smaller coordinate point pattern or a narrower bar.

Figure 3:
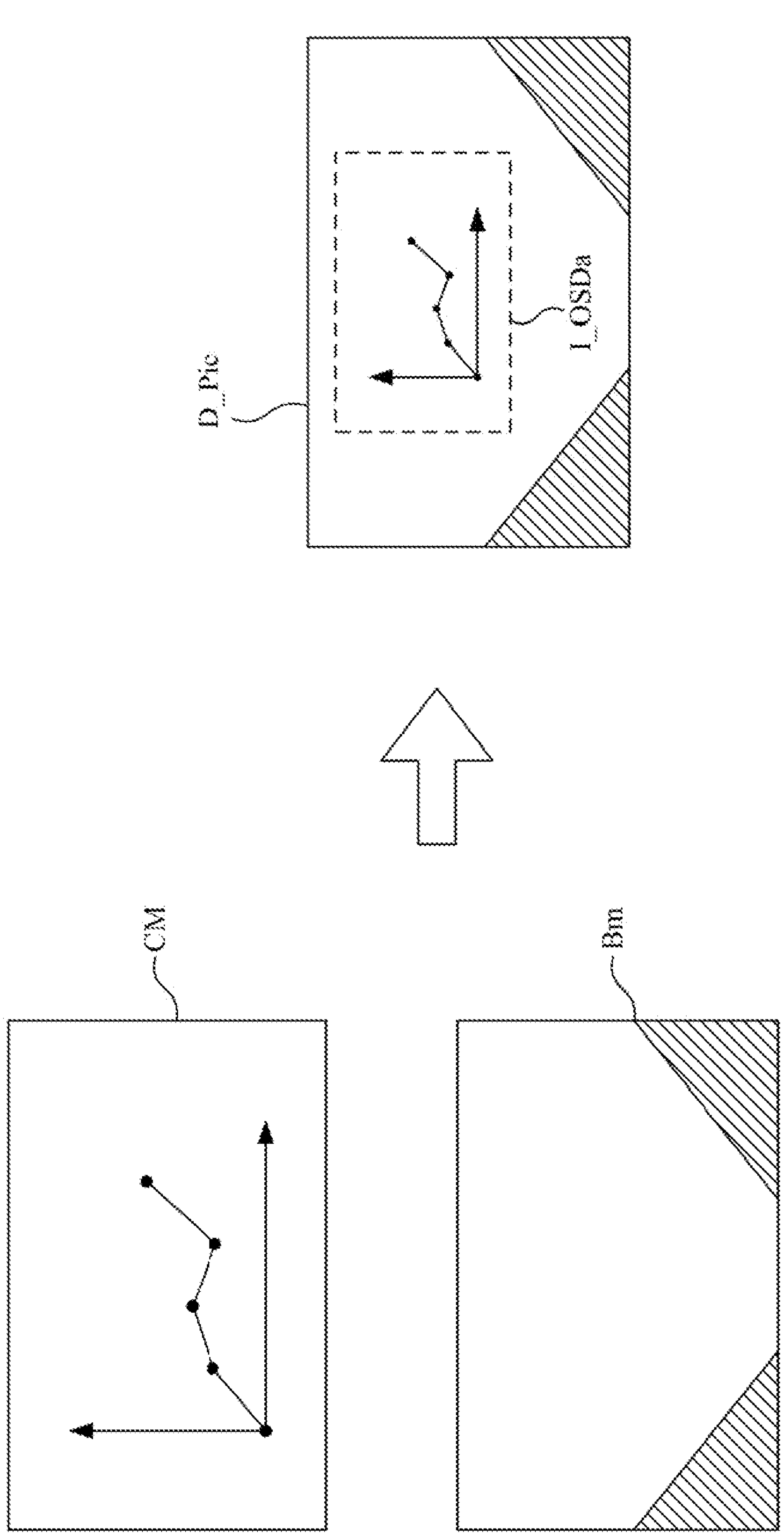
FIG. 3 is a schematic diagram of image overlaying in accordance with some embodiments of the present disclosure.

Please refer to FIG. 3 at the same time. FIG. 3 is a schematic diagram of image overlaying in accordance with some embodiments of the present disclosure. In step S270, the computing circuit 124 converts the raw data VD into a chart image CM according to the target chart template. Person having ordinary skill in the art can understand how to use the organized raw data VD to draw a graph with a specified type, and for the sake of brevity, the details are not repeated herein.

Next, in step S280, the computing circuit 124 outputs the display data DDa according to the chart image CM. Specifically, the computing circuit 124 overlays the chart image CM to a background image Bm, and generates the display data DDa according to the result of overlaying. The display picture D_Pic in FIG. 3 is generated by the display circuit 130 according to the display data DDa, and the content of the display picture D_Pic is the new image generated by overlaying the chart image CM to the background image Bm. In other words, the display picture D_Pic comprises the chart image CM and the background image Bm at the same time, and the chart image CM forms the OSD information I_OSDa in the display picture D_Pic.

In some embodiments, the computing circuit 124 receives video data from an external video source (not shown, e.g., a display card) and acquires the background image Bm from the video data in step S280. In some embodiments that the external video source does not exist, the background image Bm may be stored in the memory 126 or the memory 128.

In other embodiments, the computing circuit 124 determines whether it has received the video data from an external video source in step S280. If it has, the computing circuit 124 acquires the background image Bm from the video data. If it has not, the computing circuit 124 reads the background image Bm in the memory 126 or the memory 128.

In some embodiments, during the process of receiving the update data UDa and updating the raw data VD by the computing circuit 124 (i.e., during steps S210-S250), the computing circuit 124 may read a default image in the memory 126 and generate the display data according to the default image, so as to control the display circuit 130 to provide a display picture comprising the default image. The default image is used to inform the user that the computing circuit 124 is receiving the update data UDa. For example, the default image may comprise text such as "value sending". In other embodiments, when the computing circuit 124 finish updating the raw data VD (i.e., finish executing step S250, or the determination of step S230 is "Yes"), the computing circuit 124 may read another default image in the memory 126, and control the display circuit 130 to provide a display picture comprising the another default image. The another default image is used to inform the user that the computing circuit 124 has finished updating the raw data VD. For example, the another default image may comprise text such as "value modified successfully".

Figure 4:
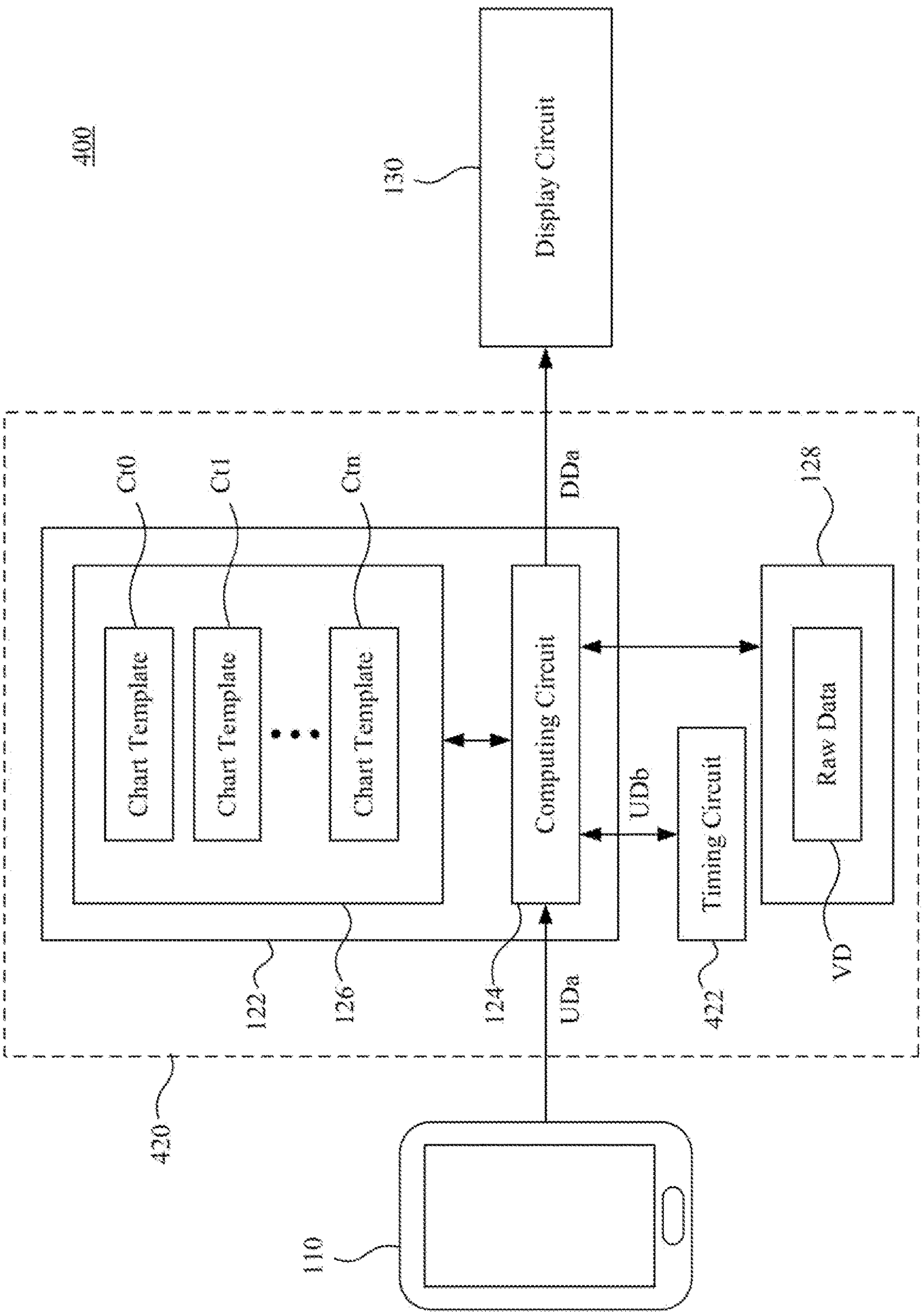
FIG. 4 is a simplified functional block diagram of a display system in accordance with some embodiments of the present disclosure.

FIG. 4 is a simplified functional block diagram of a display system 400 in accordance with some embodiments of the present disclosure. The display system 400 comprises the input device 110, a control circuit 420 and the display circuit 130. The display system 400 is similar to the display system 100 in FIG. 1, thus only the differences between the two will be described below. The control circuit 420 comprises the display control chip 122, the memory 128 and a timing circuit 422. The timing circuit 422 is configured to calculate operating time information of the display circuit 130, and output the operating time information as an update data UDb to the computing circuit 124. The computing circuit 124 updates the raw data VD in the memory 128 by using the update data UDb.

In an embodiment, the operation time information is the lighting time statistics of the display circuit 130 in a fixed time period (e.g., one day or one week). For example, the display circuit 130 may record the time that the display circuit 130 is turned on in one hour, in regard to each hour in 24 hours. For another example, the display circuit 130 may record the time that the display circuit 130 is turned on in one day, in regard to each day in 7 days. Therefore, the timing circuit 422 may take a plurality of time points (i.e., multiple days or multiple hours) having a fixed time period as the plurality of first axis values of the update data UDb, and take the lighting time as the plurality of second axis values of the update data UDb. The computing circuit 124 may perform operations similar to the aforementioned steps S210-S250 to use the update data UDb to update the raw data VD in the memory 128, and for the sake of brevity, the details are not repeated herein.

It can be known from the above that the display system 100 in FIG. 1 and the display system 400 in FIG. 4 can store customized information for a long time. Even if the display device formed by the control circuit 120 (or the control circuit 420) and the display circuit 130 is powered off, the display device can still display the information previously stored by the user again when the display device is powered on next time. Therefore, the display systems 100 and 400 have a high flexibility, and are suitable for various situations where OSD information needs to be modified. For example, during the inspection before the display device leaves the factory, the various optical characteristics measured by the inspector for the display device can be directly presented as graphical OSD information on the display device, so as to reduce the amount of equipment required for testing.

Certain terms are used in the specification and the claims to refer to specific components. However, those of ordinary skill in the art would understand that the same components may be referred to by different terms. The specification and claims do not use the differences in terms as a way to distinguish components, but the differences in functions of the components are used as a basis for distinguishing. Furthermore, it should be understood that the term "comprising" used in the specification and claims is open-ended, that is, including but not limited to. In addition, "coupling" herein includes any direct and indirect connection means. Therefore, if it is described that the first component is coupled to the second component, it means that the first component can be directly connected to the second component through electrical connection or signal connections including wireless transmission, optical transmission, and the like, or the first component is indirectly electrically or signally connected to the second component through other component(s) or connection means.

It will be understood that, in the description herein and throughout the claims that follow, the phrase "and/or" includes any and all combinations of one or more of the associated listed items. Unless the context clearly dictates otherwise, the singular terms used herein include plural referents.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. An operating method for a display control chip, wherein the display control chip comprises a first memory configured to store a plurality of chart templates, the operating method comprises:

using first update data to update raw data in a second memory;

determining a target chart template of the plurality of chart templates according to the raw data, comprising:

in response to the first update data comprising a plurality of first axis values and a plurality of second axis values respectively corresponding to a first axis and a second axis, determining the target chart template that belongs to a 2D chart template of the plurality of chart templates; and in response to the first update data comprising the plurality of first axis values corresponding to the first axis and not comprising the plurality of second axis values, determining the target chart template that belongs to a 1D chart template of the plurality of chart templates;

converting the raw data into a chart image according to the target chart template;

outputting first display data according to the chart image, wherein the first display data is for generating a first display picture comprising the chart image;

in response to receiving the first update data, reading a default image from the first memory, wherein the default image is configured to indicate an update status related to the first update data;

outputting second display data according to the default image, wherein the second display data is for generating a second display picture comprising the default image;

receiving second update data from a timing circuit, wherein the timing circuit is configured to calculate an operating time information of a display circuit that generates the first display picture, and configured to use the operating time information as the second update data; and using the second update data to update the raw data.

2. The operating method of claim 1, wherein using the first update data to update the raw data in the second memory comprises:

receiving the plurality of first axis values of the first update data;

updating a plurality of first axis values of the raw data, by using the plurality of first axis values of the first update data;

receiving the plurality of second axis values of the first update data; and updating a plurality of second axis values of the raw data, by using the plurality of second axis values of the first update data.

3. The operating method of claim 1, wherein determining the target chart template of the plurality of chart templates according to the raw data comprises:

selecting the target chart template from the plurality of chart templates, according to chart type information of the raw data, wherein the chart type information is related to a chart type that a user specifies to generate.

4. The operating method of claim 3, wherein selecting the target chart template from the plurality of chart templates comprises:

determining a plurality of candidate chart templates matching the chart type information from the plurality of chart templates; and selecting the target chart template from the plurality of candidate chart templates, according to at least one of the number of a plurality of first axis values of the raw data and the number of a plurality of second axis values of the raw data.

5. The operating method of claim 1, wherein outputting the first display data according to the chart image comprises:

overlaying the chart image to a background image to generate the first display data, wherein the background image is stored in the first memory.

6. The operating method of claim 1, wherein outputting the first display data according to the chart image comprises:

receiving a background image from an external video source; and overlaying the chart image to the background image to generate the first display data.

7. A display control chip, comprising:

a first memory, configured to store a plurality of chart templates;

a computing circuit, coupled to the first memory, configured to receive first update data, and configured to use the first update data to update raw data in a second memory; and a timing circuit, configured to calculate an operating time information of a display circuit that generates a first display picture and use the operating time information as second update data, wherein the computing circuit is further configured to receive the second update data from the timing circuit and use the second update data to update the raw data, wherein when the computing circuit reads the raw data in the second memory, the computing circuit is configured to:

determine a target chart template of the plurality of chart templates according to the raw data;

convert the raw data into a chart image according to the target chart template; and output first display data according to the chart image, wherein the first display data is for generating the first display picture comprising the chart image;

wherein when the computing circuit receives the first update data, the computing circuit is configured to:

read a default image from the first memory, wherein the default image is configured to indicate an update status related to the first update data; and output second display data according to the default image, wherein the second display data is for generating a second display picture comprising the default image, wherein when the first update data comprises a plurality of first axis values and a plurality of second axis values respectively corresponding to a first axis and a second axis, the computing circuit is configured to determine that the target chart template belongs to a 2D chart template of the plurality of chart templates, and when the first update data comprises the plurality of first axis values corresponding to the first axis and does not comprise the plurality of second axis values, the computing circuit is configured to determine that the target chart template belongs to a 1D chart template of the plurality of chart templates.

8. The display control chip of claim 7, wherein the computing circuit receives the plurality of first axis values of the first update data first, and updates a plurality of first axis values of the raw data by using the plurality of first axis values of the first update data, and then the computing circuit receives the plurality of second axis values of the first update data, and updates a plurality of second axis values of the raw data by using the plurality of second axis values of the first update data.

9. The display control chip of claim 7, wherein the computing circuit is configured to select the target chart template from the plurality of chart templates according to chart type information of the raw data, wherein the chart type information is related to a chart type that a user specifies to generate.

10. The display control chip of claim 9, wherein the computing circuit is configured to determine a plurality of candidate chart templates matching the chart type information from the plurality of chart templates first, and then select the target chart template from the plurality of candidate chart templates, according to at least one of the number of a plurality of first axis values of the raw data and the number of a plurality of second axis values of the raw data.

11. The display control chip of claim 7, wherein the computing circuit is configured to overlay the chart image to a background image to generate the first display data, wherein the background image is stored in the first memory.

12. The display control chip of claim 7, wherein the computing circuit is configured to receive a background image from an external video source, and configured to overlay the chart image to the background image to generate the first display data.

13. A display system, comprising:

an input device, configured to receive a plurality of values inputted by a user, and convert the plurality of values into first update data;

a display control chip, configured to communicate with the input device for receiving the first update data, and comprising a first memory, wherein the first memory is configured to store a plurality of chart templates;

a second memory, configured to store raw data;

a display circuit; and a timing circuit, configured to calculate an operating time information of the display circuit, use the operating time information as second update data, and output the second update data to the display control chip, wherein the display control chip is configured to use the second update data to update the raw data, wherein the display control chip is coupled to the second memory and the display circuit, and is configured to use the first update data to update the raw data, wherein when the display control chip reads the raw data in the second memory, the display control chip is configured to:

determine a target chart template of the plurality of chart templates according to the raw data;

convert the raw data into a chart image according to the target chart template; and output first display data according to the chart image, wherein the first display data is for generating a first display picture comprising the chart image, wherein when the display control chip receives the first update data, the display control chip is configured to:

read a default image from the first memory, wherein the default image is configured to indicate an update status related to the first update data; and output second display data according to the default image, wherein the second display data is for generating a second display picture comprising the default image, wherein when the first update data comprises a plurality of first axis values and a plurality of second axis values respectively corresponding to a first axis and a second axis, the display control chip is configured to determine that the target chart template belongs to a 2D chart template of the plurality of chart templates, and when the first update data comprises the plurality of first axis values corresponding to the first axis and does not comprise the plurality of second axis values, the display control chip is configured to determine that the target chart template belongs to a 1D chart template of the plurality of chart templates.

14. The display system of claim 13, wherein the second memory is a pluggable memory device.

15. The display system of claim 13, wherein the display control chip is configured to overlay the chart image to a background image to generate the first display data, wherein the background image is stored in the first memory.

16. The display system of claim 13, wherein the display control chip is configured to receive a background image from an external video source, and configured to overlay the chart image to the background image to generate the first display data.

* * * * *